United States Patent
Sammelmann

(10) Patent No.: US 8,743,654 B1
(45) Date of Patent: Jun. 3, 2014

(54) REFLECTIVITY MAPS

(75) Inventor: Gary S. Sammelmann, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 628 days.

(21) Appl. No.: 12/931,636

(22) Filed: Jan. 24, 2011

(51) Int. Cl.
*G01S 13/90* (2006.01)
*G01S 13/93* (2006.01)

(52) U.S. Cl.
CPC .................. *G01S 13/9307* (2013.01)
USPC .............................................................. 367/7

(58) Field of Classification Search
CPC ................................................... G01S 13/9307
USPC .............................................................. 367/7
See application file for complete search history.

(56) References Cited

U.S. PATENT DOCUMENTS

| | | | | |
|---|---|---|---|---|
| 3,716,825 A | * | 2/1973 | Walsh et al. | 367/100 |
| 5,596,549 A | * | 1/1997 | Sheriff | 367/88 |
| 2005/0058021 A1 | * | 3/2005 | Feintuch et al. | 367/99 |

OTHER PUBLICATIONS

Leblond I. et al, "Use of classification and segmentation of sidescan sonar images for long term registration", Oceans, Europe 2005, pp. 322-327.*
Coiras et al., "Multiresolution 3-D reconstruction from side-scan sonar images", IEEE transactions on image processing, vol. 16, No. 2 Feb. 2007.*
Ferguson el al., "Generalized framework for real aperture, Synthetic aperture, and tomographic sonar imaging", IEEE Journal of Oceanic Engineering, vol. 34, No. 3, Jul. 2009.*

* cited by examiner

*Primary Examiner* — Luke Ratcliffe
*Assistant Examiner* — Hovhannes Baghdasaryan
(74) *Attorney, Agent, or Firm* — James T. Shepherd

(57) ABSTRACT

Systems and methods for embedding three-dimensional targets in realistic sonar images are provided. An actual or synthetic sonar image is first created and a reflectivity map is produced therefrom. A direct path bottom reverberation is calculated to which texture is added by multiplying the signal from a given point on the bottom at coordinates (x,y) by the reflectivity map R(x,y) at that point and in which targets are embedded. Echoes from targets and other noise sources are superimposed on the direct path bottom reverberation to generate raw unbeamformed stave data. The stave data is beamformed to produce the desired complex image with the desired targets naturally embedded therein.

13 Claims, 4 Drawing Sheets

REFLECTIVITY MAPS

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

Not applicable.

BACKGROUND OF THE INVENTION (1) Field of the Invention

The present invention relates to simulating the texture of a sonar image. More particularly, the present invention relates to creating realistic sonar images in which three-dimensional targets can be embedded.

(2) Description of the Prior Art

In current warfare scenarios, operations in shallow water environments are becoming increasingly critical. Accordingly, the use of and interpretation of sonar images for detecting objects or targets on the ocean bottom have become increasingly important.

A sonar image typically is comprised of a matrix of points or picture elements (pixels) displayed on either a cathode ray tube or paper. The points or pixels have a grayness level ranging from 0 to 255 on a grayness scale. Objects normally appear on sonar images as a highlight-shadow combination, particularly when the sonar images are generated by a moving vehicle. A sonar scan for short distances typically comprises a massive amount of data which must be reviewed in short time periods.

While computer interpretations of sonar images have been developed, the majority of interpretations are accomplished by human analysts looking at the sonar scans. As an analyst reviews the scans, the analyst marks areas where specific objects or features are inferred to be present on the ocean bottom. Because of the massive amounts of data that must be reviewed in short time periods, proper training of human analysts is necessary to avoid frequent errors or omissions in both detection and classification.

One aspect of this training is target recognition. Generally, the training consists of presenting to an analyst sonar images in which targets have been embedded. The analyst gradually learns to discern the targets from the background. In order for the training to be effective, the sonar images presented to an analyst ideally would represent real world scenarios.

The current method of embedding targets in realistic sonar images involves cutting and pasting snippets of targets into an actual-image. However, this method creates artifacts and does not preserve the phase of the image. Accordingly, the images that analysts currently are trained on do not represent real world scenarios and the accuracy with which an analyst can identify real world targets may suffer. What are needed are systems and methods of embedding three-dimensional targets in realistic sonar images.

SUMMARY OF THE INVENTION

It is therefore a general purpose and primary object of the present invention to provide systems and methods for creating realistic sonar images in which three-dimensional targets can be embedded. A sonar image is first created and a reflectivity map is produced therefrom. The sonar image can be an actual sonar image created with a time-varying gain to produce an image which has approximately uniform intensity.

Alternately, a sonar image is created at block 102 using a synthetic two-dimensional array of pixels with the desired background. A direct path bottom reverberation is calculated, to which texture is added by multiplying the signal from a given point on the bottom at coordinates (x,y) by the reflectivity map R(x,y) at that point.

In calculating the direct path bottom reverberation, the bottom is divided into facets and targets are embedded therein as collections of facets and edges. Pressure amplitudes are assigned to each facet and the amplitudes are scaled to account for target hiding. The root mean square of the amplitudes are determined and the contributions of the facets are integrated over the bottom.

Echoes from the targets and other noise sources are superimposed on the direct path bottom reverberation to generate the raw unbeamformed stave data. The stave data is beamformed to produce the desired complex image with the desired targets naturally embedded therein.

To assist in performing the computationally intensive calculations described above, known sonar simulation tools can be employed, including the Personal Computer Shallow-Water Acoustic Tool set (PC SWAT). The aforementioned sonar image, environmental and target data can be imported into PC SWAT in a compatible format data file.

The BOTTOM REFLECTIVITY MAP option is selected from the PC SWAT menu and PC SWAT can create the reflectivity map described previously. To obtain the raw stave data, an IMAGING command is run in PC SWAT, which performs the calculations and computations described with respect to calculating the direct path bottom reverberation and superimposing the echoes. PC SWAT can then beam-form this raw data to create the synthetic sonar image with the embedded targets.

In one embodiment, a method of embedding one or more targets in a sonar image includes creating the sonar image and producing a reflectivity map from the sonar image. Using the sonar image and the reflectivity map, direct path bottom reverberation is calculated. Raw stave data is generated by superimposing echoes from the targets on the direct path bottom reverberation and the raw stave data is beamformed to obtain a sonar image having the targets embedded therein.

The sonar image can be created using an actual sonar image with a time-varying gain. The sonar image can be a simulated sonar image using a synthetic two-dimensional array and a computer generated background. A three-dimensional bottom terrain can be specified as a random superposition of sinusoids. Alternately, or in combination, an ocean bottom topography map can be incorporated into the simulated sonar image and a background can be simulated using correlated k-distributions.

Calculating the direct path bottom reverberation can include multiplying a signal from a given point on the bottom of the sonar image by the reflectivity map at that given point. The step of calculating can also include dividing the bottom into a plurality of facets having dimensions smaller than a resolution of the sonar image and specifying a collection of facets that describe the targets.

Calculating direct path bottom reverberation can further include assigning a pressure amplitude to each of the facets, scaling the pressure amplitude to account for target occlusion, obtaining a root mean square pressure amplitude scattered from each of the facets based on the scaled pressure amplitude and integrating the root mean square pressure amplitude over the bottom of the sonar image.

In one embodiment, a method of embedding one or more targets in a sonar image includes creating a data file of the sonar image and incorporating data for the targets into the data file. Environmental data can also be incorporated into the data file.

The data file is imported into a sonar simulation, which is initiated to produce a reflectivity map from the data file. The sonar simulation is activated to image the data file and the reflectivity map to generate raw stave data. The sonar simulation beamforms the raw stave data to obtain a sonar image having the targets embedded therein.

As previously described, the sonar image can be created using an actual sonar image with a time-varying gain. The sonar image can be a simulated sonar image using a synthetic two-dimensional array and a computer generated background. A three-dimensional bottom terrain can be specified as a random superposition of sinusoids. Alternately, or in combination, an ocean bottom topography map can be incorporated into the simulated sonar image and a background can be simulated using correlated k-distributions.

In initiating the sonar simulation, various lookup tables can be initialized. The lookup tables can include scattering strength tables for surface and bottom reverberation and amplitude and phase tables of the transmitted signal as a function of range and depression angle.

BRIEF DESCRIPTION OF TIM DRAWINGS

A more complete understanding of the invention and many of the attendant advantages thereto will be readily appreciated as the same becomes better understood by reference to the following detailed description when considered in conjunction with the accompanying drawings wherein like references numerals and symbols designate identical or corresponding parts throughout the several views and wherein.

Figure 4:
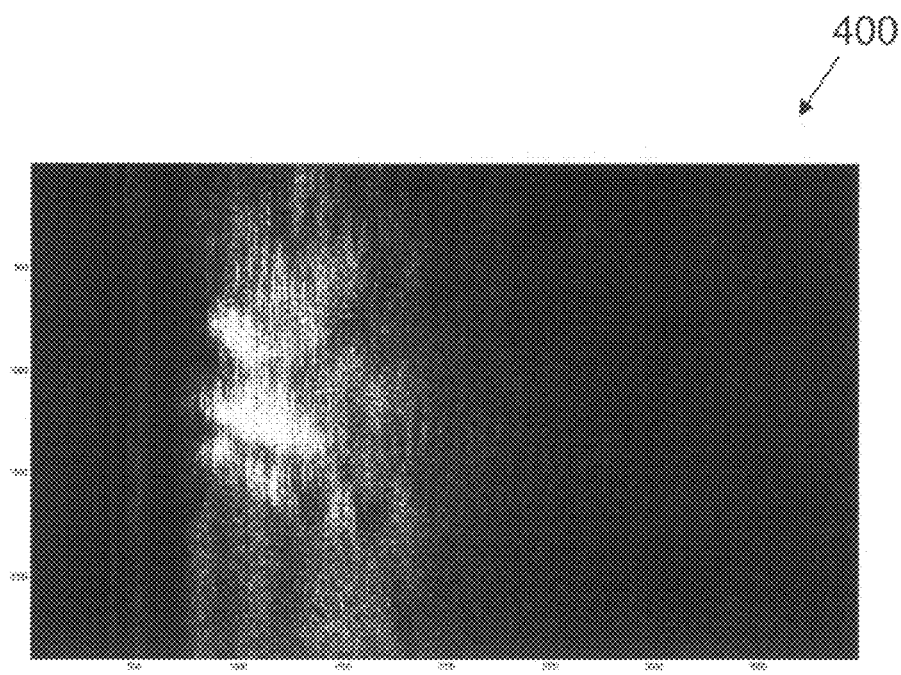

FIG. 4. illustrates raw (unbeamformed) stave data; and

Figure 3:
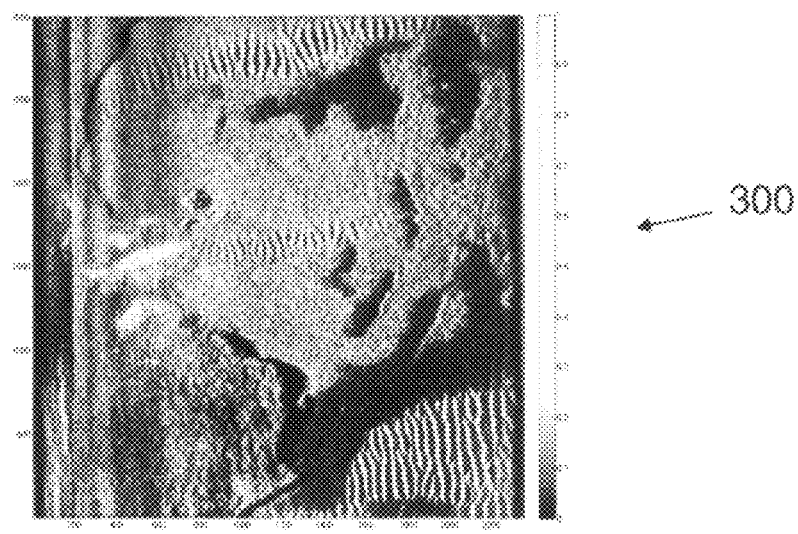
FIG. 3 illustrates an actual sonar image.
Figure 5:
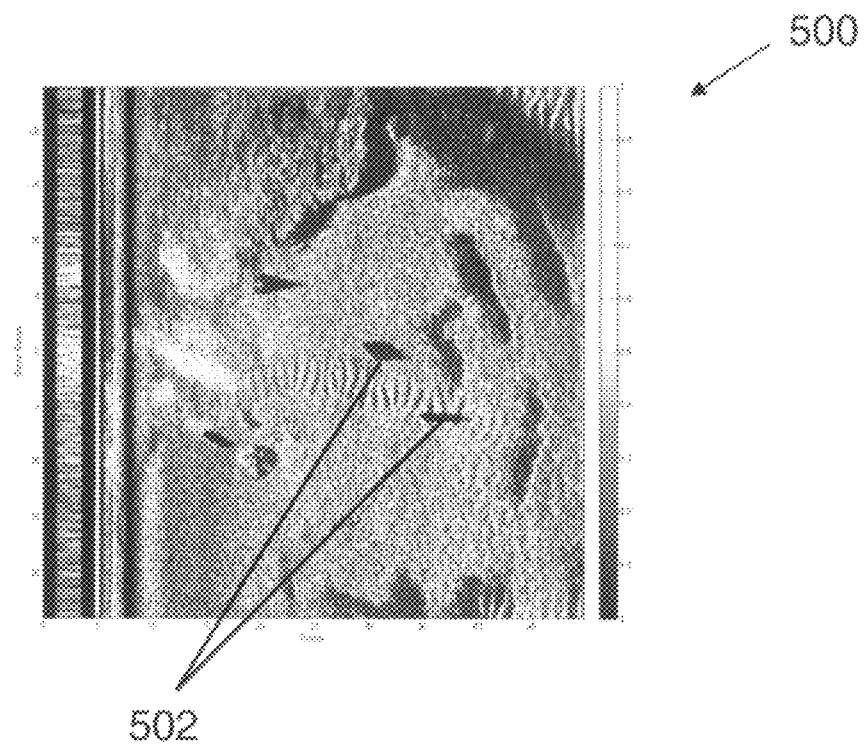

FIG. 5. illustrates a beamformed image with targets embedded in the sonar image of FIG. 3.

DESCRIPTION OF TEE INVENTION

Figure 1:
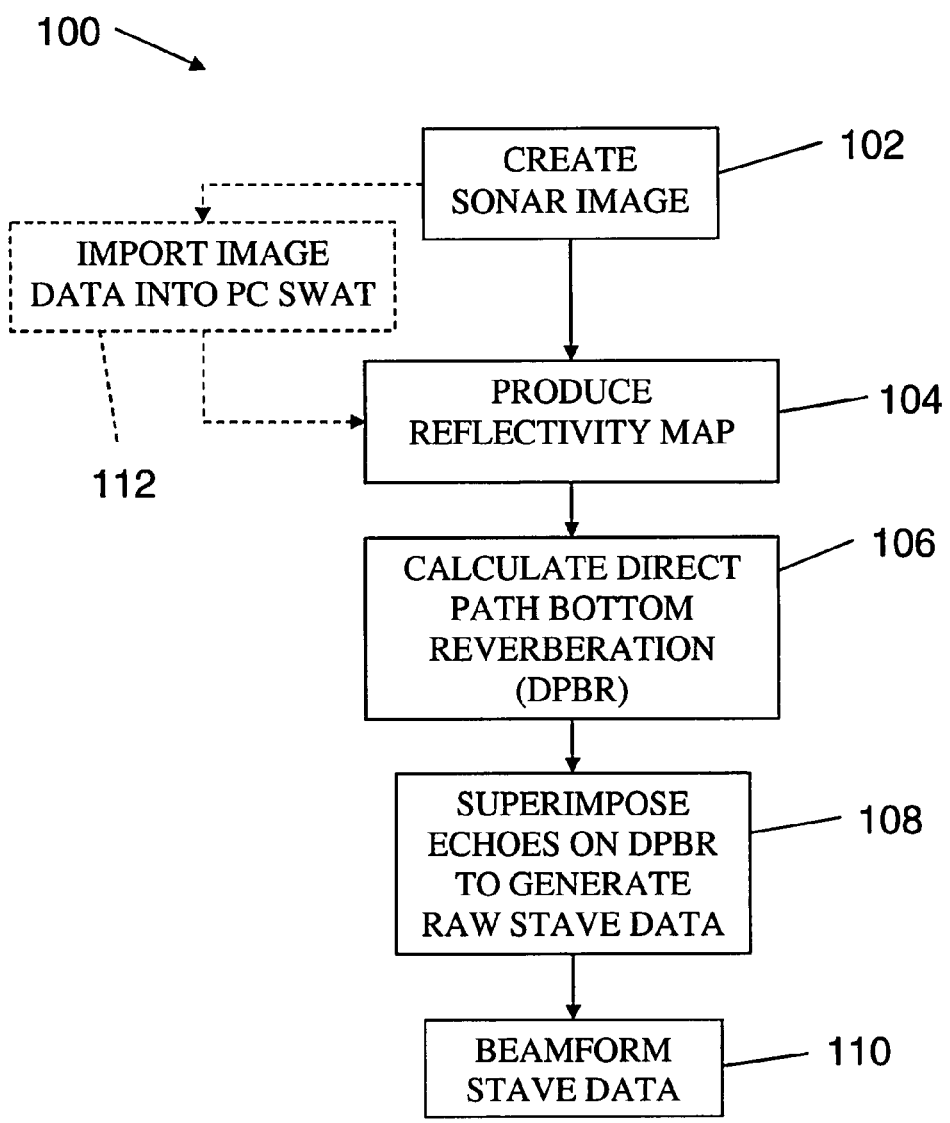
FIG. 1 is a block diagram of a method of embedding three-dimensional targets in realistic sonar images.

Referring now to FIG. 1, there is shown a block diagram of method 100 for creating realistic sonar images in which three-dimensional targets can be embedded. At block 102, a sonar image is created. In a manner known to those of skill in the art, an actual sonar image is created with a time-varying gain to produce an image which has approximately uniform intensity.

Alternately, a sonar image is created at block 102 using a synthetic two-dimensional array of pixels with the desired background. A sonar image for a side-scan sonar is a two-dimensional array of pixels whose amplitude is proportional to the beam-formed pressure at the location (x,y). The image is normalized such that the average pixel value is one.

Assuming the sonar pulse is traveling along the y-axis, the image is normalized such that the average over y for each value of range (x) is equal to unity. This corresponds to time varying, which normalizes the average background to unity.

At block 104, a reflectivity map is produced as a function of the horizontal location of an image pixel in the sonar image. In a manner known to those of skill in the art, the reflectivity map is produced by identifying each point at coordinate (I,j) in the normalized two-dimensional array with a location (x,y) in the x-y horizontal plane.

Figure 2:
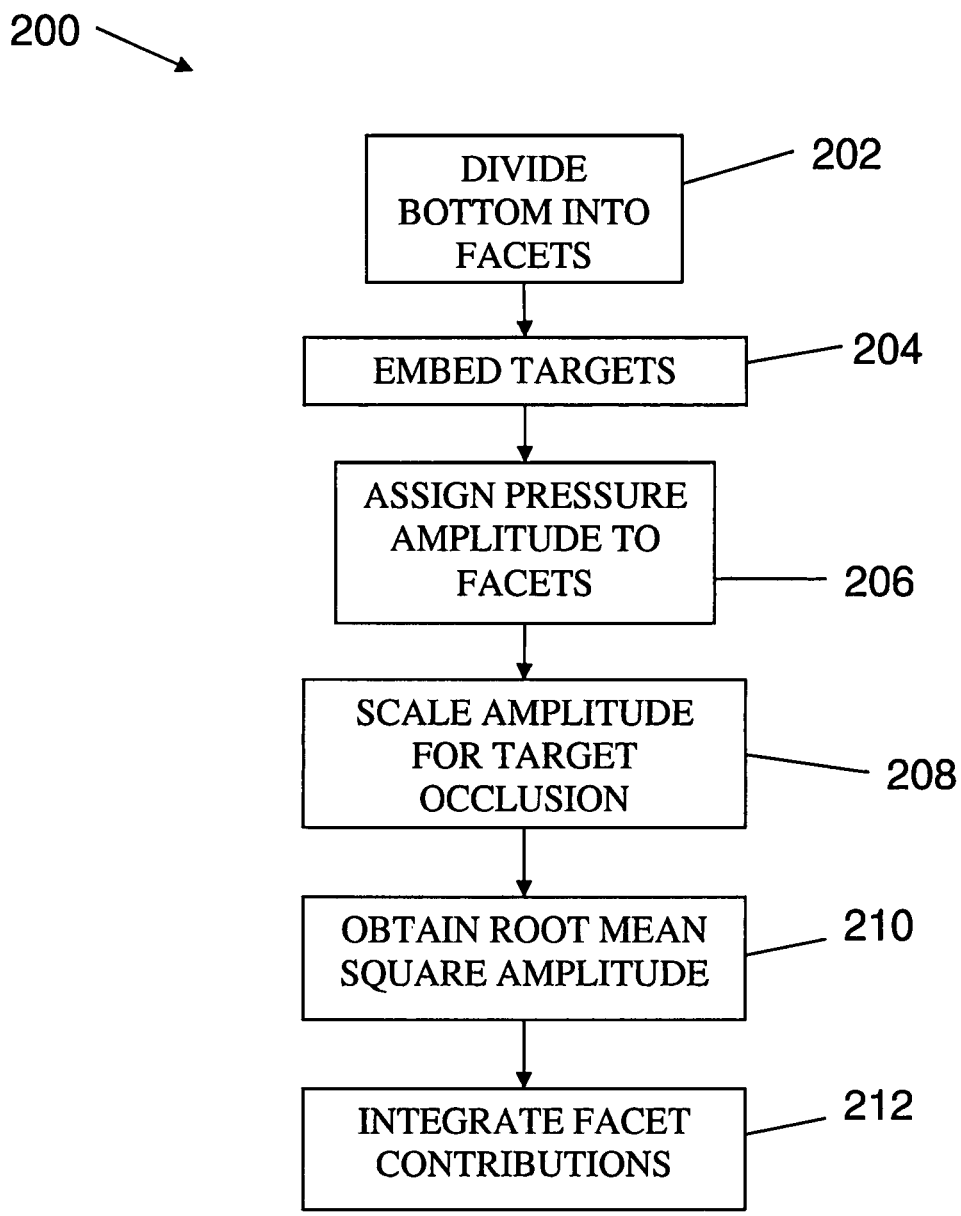
FIG. 2 is a block diagram of a method of calculating direct path bottom reverberation.

At block 106, direct path bottom reverberation is calculated. Referring also to FIG. 2, there is shown a block diagram of a method 200 for calculating direct path bottom reverberation. The bottom is first divided into a collection of rectangular facets (block 202) whose dimensions are typically smaller than the resolution of the sonar. Targets are embedded into the image (block 204) by specifying a collection of facets and edges that describe the targets.

A pressure amplitude, $P_{Scatt}$, is assigned to each facet on the bottom (block 206). The pressure amplitude has the following form:

$$P_{Scatt} = P_0 R(x,y) A_{in} A_{out} \sqrt{S(\vartheta_i, \vartheta_s, \varphi)\text{Area}}\, A_{random} e^{i\varphi_{Random}}, \quad (1)$$

where:

$P_0$ is the source level of the incident field;

$R(x,y)$ is the value of the reflectivity map at the point on the bottom;

$A_{In}$ and $A_{Out}$ are the amplitude of the incoming and outgoing eigenrays, respectively;

$S(\theta_i, \theta_s, \phi)$ is the bottom scattering strength;

Area is the area of the facet; and $A_{random}$ and $e^{i\varphi_{Random}}$ are a pair of random numbers representing the random amplitude and phase of the facet.

By multiplying the signal from a given point on the bottom at coordinates (x,y) by the reflectivity map R(x,y) at that point, as shown in Equation 1, texture is added to the direct path bottom reverberation. At block 208, the pressure amplitude of a given facet is multiplied by a scale factor between zero and one, depending on whether the facet is hidden or occluded by a target.

As known to those of skill in the art, a system of linear and quadratic equations can be solved to obtain the intersection point of a given eigenray with a target and thus determine whether or not there is occlusion of a given facet by a target. If one ignores diffraction from the target, the pressure amplitude from a facet shadowed by a target is set equal to zero.

To include diffractive effects, the following empirical equation, based on shadowing by a sphere, can be used to determine the scale factor:

$$\text{ScaleFactor} = 2J_1(x)/x \text{ and } x = \sqrt{\frac{k}{s}}\, a, \quad (2)$$

where:

k is the wave-number;

s is the horizontal distance from the point on the bottom and the intersection point on the target; and a is a characteristic scale parameter of the target, such as the diameter of a cylinder. In the high frequency limit, the scale factor approaches zero, and the shadow is infinitely deep, except for corrections due to multipaths, noise, and the integrated side lobes of the beam-former.

At block 210, the Root Mean Square (RMS) pressure amplitude scattered from each facet is obtained. The RMS pressure amplitude has the following form, $$|P^2_{Scatt} r^2/P^2_{Inc}| = S(\theta_i, \theta_s, \phi)\text{Area}, \quad (3)$$

where:

r is the distance from the center of the facet to the receiver; and $P_{Inc}$ is the incident pressure at the facet. The directionality of the scattered field is given by the scattering strength. At block 212, the RMS pressure amplitude contributions from each facet for each ping are summed by performing a surface integral over the bottom to obtain the direct path bottom reverberation. Using a stochastic integral, a random function of the coordinates of a point on the bottom (surface) is summed over the area insonified by the sonar.

Referring back to Equation 1, $A_{random}$, and $e^{i\Phi_{Random}}$ are chosen such that the RMS source level of the facet is given by Equation 3 and the reverberation obeys the correct statistics. These random numbers are a function of position and have the same value for a given facet from ping to ping. This coherence of the bottom return is important when beamforming the synthetic data for a synthetic aperture sonar.

Referring back to FIG. 1, the echoes from the targets and other noise sources are superimposed on the direct path bottom reverberation to generate the raw unbeamformed stave data (block 108). The stave data is beamformed to produce the desired complex image with the desired targets naturally embedded with the image (block 110).

Referring now to FIG. 3, there is depicted an image 300 of an actual high frequency synthetic aperture sonar, as would be created at block 102. The image of FIG. 3 is used to produce a reflectivity map, as at block 104. This reflectivity map is used as a texture on the unbeamformed direct path bottom reflection, as calculated at block 106.

FIG. 4 depicts an image 400 of raw unbeamformed stave data created by superimposing echoes on the direct path bottom reverberation, as at block 108. The raw stave data is beamformed, as at block 110, to produce image 500 depicted in FIG. 5. Image 500 shows original image 300 with targets (exemplified by reference numeral 502) and other noise sources superimposed upon image 300. A plurality of images, such as image 500 depicted in FIG. 5, can be used in training sonar analysts to identify targets within realistic sonar images.

As is known to those of skill in the art, the calculations described with reference to FIGS. 1 and 2 are computationally intensive. Numerous tools have been developed to assist in performing such calculations. One such tool is a user friendly sonar simulation known to those of skill in the art as the Personal Computer Shallow Water Acoustic Tool set (PC SWAT).

PC SWAT is an object oriented program written in the computer language C++. The kernel of PC SWAT consists of approximately 100 files, with another 500 files for the graphical user interface and another 10,000 for plotting the different outputs generated from PC SWAT. PC SWAT also comes in a DLL (Dynamic Link Library) version which allows users to write their own programs and call upon different functions within PC SWAT to perform some calculation, such as creating a synthetic image (block 102 of FIG. 1), or beam-forming some sonar data (block 110 of FIG. 1).

Among the functions available in PC SWAT are those providing calculations of signal-to-noise ratio (SNR) and shadow contrast for a wide class of either a detection or imaging sonar. Additionally, PC SWAT contains probability of detection and classification models which convert the SNR and shadow contrast of a sonar in a given environment into a probability of detection and classification. This allows the user to ascertain the anticipated performance of the system. This feature also allows the user to perform trade off studies in the design of a sonar in order to maximize its effectiveness.

Further, PC SWAT computes acoustic propagation in a time varying, three-dimensional environment using a version of a Gaussian ray bundle.

The properties of the water column, such as sound speed, temperature and bubble density, can be specified in a 3-dimensional grid, as well as other variables (e.g., wind speed and bottom type) can be specified in a two-dimensional grid. A time varying model of bubble density due to breaking waves in the surf zone has also been developed for PC SWAT.

PC SWAT also contains a list of three-dimensional targets. The target shape is specified by a collection of facets and edges. The scattering from the target is modeled by a combination of the Kirchhoff approximation for scattering by the facets, geometric theory of diffraction for scattering by a finite edge and scattering by simple point sources.

PC SWAT uses monostatic and bistatic bottom scattering models to describe bottom reverberation. A variation of a bistatic surface scattering model is used to model scattering from the sea surface.

A number of models of sediment penetration used in the computation of the signal from a buried target are included in PC SWAT. PC SWAT contains a model for the case of a flat interface, which includes the evanescent wave in the case of subcritical penetration. Also, PC SWAT uses one or both of an up to sixth order perturbation theory, or second order small slope approximation to describe sediment penetration in the case of a sinusoidal interface, e.g., sand ripples. Further, PC SWAT uses second order perturbation theory to describe sediment penetration in the case where the interface is composed of the superposition of a primary and secondary sinusoid.

The PC SWAT user can specify a three-dimensional bottom terrain as a random superposition of sinusoids. Also included are both shadowing by the terrain and the occlusion of a proud, or unburied, target by the terrain. The user can further specify the sea surface as a random superposition of time varying sinusoids, representing an evolving sea surface. PC SWAT also computes the SNR for an acoustic modem in a three-dimensional environment and converts the SNR into a bit error rate using a known formula described in digital communications' text.

PC SWAT allows the user to import an arbitrary waveform for the transmitted signal and to create synthetic data from a sonar for proud, partially buried, and buried targets. PC SWAT can then beam-form this raw data to create a synthetic sonar image and further allow a user to create a bistatic sonar image, where the source and receiver are located on separate vehicles.

To incorporate the use of PC SWAT into method 100, the sonar image, environmental and target data is imported into PC SWAT in a data file in a format compatible with PC SWAT (shown in phantom at block 112 of FIG. 1). The BOTTOM REFLECTIVITY MAP option is selected from the PC SWAT menu and PC SWAT creates a reflectivity map in the manner described with respect to block 104.

To obtain the raw stave data at block 108, an IMAGING command is run in PC SWAT, which performs the calculations and computations described with respect to blocks 106 and 108. As previously mentioned, PC SWAT can then beam-form this raw data to create a synthetic sonar image, as at block 110. In performing blocks 106 and 108, PC SWAT initializes various lookup tables, such as tables of scattering strength for the surface and bottom reverberation and the amplitude and phase of the transmitted signal as a function of range and depression angle.

As is known to those of skill in the art, PC SWAT creates the received time series for surface, bottom, volume reverberation and target scattering for each frequency sub-band and element in the projector and the receiver. PC SWAT performs a loop over all the pings in the sonar image. Within this loop, PC SWAT performs a loop over each element in the receiver.

Within this loop is a loop over all the elements in the projector (transmitter). Within this loop is a loop over all of the frequency sub-bands for the transmitted signal. Within this loop, PC SWAT computes the time series received at the given receive element from ambient noise and the scattering by the sea surface, bottom surface, volume inhomogeneities and targets within the scene.

These time series for each frequency sub-band are summed coherently to give the total signal in a given sub-band. This time series is convolved with the corresponding sub-band of the transmitted signal and the result is added to the total time series. Upon completion of the sum over frequency sub-bands, the time series is written to an ASCII file as the total time series at a given receiver element during a given ping. This process is repeated for all the receiver elements and each ping in the raw sonar image.

What have thus been described are systems and methods for creating realistic sonar images in which three-dimensional targets can be embedded. An actual or synthetic sonar image is first created and a reflectivity map is produced therefrom. A direct path bottom reverberation is calculated, to which texture is added by multiplying the signal from a given point on the bottom at coordinates (x,y) by the reflectivity map R(x,y) at that point.

In calculating the direct path bottom reverberation, the bottom is divided into facets and targets are embedded therein as collections of facets and edges. Echoes from the targets and other noise sources are superimposed on the direct path bottom reverberation to generate the raw unbeamformed stave data. The stave data is beamformed to produce the desired complex image with the desired targets naturally embedded therein.

Obviously, many modifications and variations of the present invention may become apparent in light of the above teachings. For example, the sonar image can be created using ocean bottom topography maps. Also, realistic backgrounds can be simulated using correlated k-distributions. Further, bottom height can be specified as a sum of randomly chosen sinusoids.

It will be understood that many additional changes in details, steps and arrangements thereof, which have been described herein and illustrated in order to explain the nature of the invention, may be made by those skilled in the art within the principle and scope of the invention as expressed in the appended claims.

What is claimed is:

1. A method of training an analyst to identify at least one target embedded in a first sonar image, comprising the steps of:
   providing a computer having a sonar simulation tool installed thereon;
   operatively connecting a human-readable display to said computer;
   providing said first sonar image to said sonar simulation tool on said computer;
   producing a reflectivity map from said first sonar image;
   calculating direct path bottom reverberation;
   superimposing echoes from said at least one target on said direct path bottom reverberation to generate raw stave data;
   beamforming said raw stave data to obtain a second sonar image having said at least one target embedded therein; and
   displaying said second sonar image on said display.

2. The method of claim 1, wherein said step of providing said first sonar image further comprises downloading an actual sonar image with a time-varying gain onto said computer.

3. The method of claim 2, wherein said step of calculating said direct path bottom reverberation further comprises multiplying a signal from a given point on a bottom of said first sonar image by said reflectivity map at said given point.

4. The method of claim 3, wherein said step of calculating said direct path bottom reverberation further comprises the steps of:
   dividing said bottom into a plurality of first facets having dimensions smaller than a resolution of said first sonar image;
   specifying a collection of second facets that describe said at least one target;
   assigning a pressure amplitude to each one of said first and second facets;
   scaling said pressure amplitude to account for target occlusion to obtain a scaled pressure amplitude;
   obtaining a root mean square pressure amplitude scattered from each one of said first and second facets based on said scaled pressure amplitude; and
   integrating said root mean square pressure amplitude over said bottom.

5. The method of claim 1, wherein said step of providing said first sonar image further comprises producing a simulated sonar image using a synthetic two-dimensional array and a computer generated background.

6. The method of claim 5, wherein said step of calculating said direct path bottom reverberation further comprises the steps of:
   multiplying a signal from a given point on a bottom of said first sonar image by said reflectivity map at said given point;
   dividing said bottom into a plurality of first facets having dimensions smaller than a resolution of said first sonar image;
   specifying a collection of second facets that describe said at least one target;
   assigning a pressure amplitude to each one of said first and second facets;
   scaling said pressure amplitude to account for target occlusion to obtain a scaled pressure amplitude;
   obtaining a root mean square pressure amplitude scattered from each one of said first and second facets based on said scaled pressure amplitude; and
   integrating said root mean square pressure amplitude over said bottom.

7. The method of claim 6, wherein said step of producing a simulated sonar image further comprises at least one of:
   specifying a three-dimensional bottom terrain as a random superposition of sinusoids;
   incorporating an ocean bottom topography map; and
   simulating a background using correlated k-distributions.

8. A method of training an analyst to identify at least one target embedded in a first sonar image, comprising the steps of:
   providing a computer having a sonar simulation tool installed thereon;
   operatively connecting a human-readable display to said computers;
   creating on said computer a data file of said first sonar image;
   incorporating data for said at least one target into said data file;
   importing said data file into said sonar simulation tool;

initiating said sonar simulation tool to produce a reflectivity map from said data file;

activating said sonar simulation tool to image said data file and said reflectivity map to generate raw stave data;

further activating said sonar simulation tool to beamform said raw stave data to obtain a second sonar image having said at least one target embedded therein; and displaying said second sonar image on said display.

9. The method of claim 8, wherein said step of creating said first sonar image further comprises at least one of:

producing an actual sonar image with a time-varying gain; and producing a simulated sonar image using a synthetic two-dimensional array and a computer generated background.

10. The method of claim 9, wherein said step of producing a simulated sonar image further comprises at least one of:

specifying a three-dimensional bottom terrain as a random superposition of sinusoids;

incorporating an ocean bottom topography map; and simulating a background using correlated k-distributions.

11. The method of claim 8, wherein said step of incorporating further comprises integrating environmental data into said data file.

12. The method of claim 8, wherein said step of initiating further comprises initializing lookup tables.

13. The method of claim 12, wherein said lookup tables further comprise:

scattering strength tables for surface and bottom reverberation; and amplitude and phase tables of the transmitted signal as a function of range and depression angle.

\* \* \* \* \*